United States Patent [19]
Dickie et al.

[11] Patent Number: 5,813,674
[45] Date of Patent: Sep. 29, 1998

[54] REVERSE PRESSURE TOLERANT SEAL MEANS

[75] Inventors: Paul A. Dickie, Newington; Kurtis D. Kleis, Granby; Michael A. Mike, South Windsor, all of Conn.

[73] Assignee: United Technologies Corporation, Hartford, Conn.

[21] Appl. No.: 105,093

[22] Filed: Aug. 10, 1993

[51] Int. Cl.[6] .................................................. F16J 15/34
[52] U.S. Cl. ........................................ 277/395; 277/390
[58] Field of Search .................................. 277/58, 81 R, 277/65, 82, 85, 96, 96.1, 135, 140, 86, 205, 96.2, 93 R, 40, 395, 390

[56] References Cited

U.S. PATENT DOCUMENTS

| | | | |
|---|---|---|---|
| 2,365,046 | 12/1944 | Bottomley | 277/86 |
| 3,003,796 | 10/1961 | Meyer | 277/93 |
| 3,026,114 | 3/1962 | Andresen et al. | 277/40 |
| 3,416,808 | 12/1968 | Voitik | 277/40 |
| 3,647,227 | 3/1972 | Lojkutz et al. | 277/40 |
| 3,652,183 | 3/1972 | Pottharst | 277/40 |
| 4,231,578 | 11/1980 | Traub | 277/205 |
| 4,336,943 | 6/1982 | Chaplin | 277/26 |
| 4,406,460 | 9/1983 | Slayton | 277/25 |
| 4,585,239 | 4/1986 | Nicholson | 277/205 |
| 4,739,997 | 4/1988 | Smetana | 277/205 |

Primary Examiner—Daniel G. DePumpo
Attorney, Agent, or Firm—Gene D. Fleischhauer

[57] ABSTRACT

A seal assembly 18 for blocking the leakage of fluid between a first region 26 and a second region 28 is disclosed. Various construction details are developed for improving the sealing capability under operative conditions which cause a severe reverse pressure gradient across the seal assembly. In one particular embodiment, the seal assembly includes a seal 36 having a front 88 which faces the first region and a pair of sidewalls 92, 94 which extend from the front and are urged apart by a spring means 96.

7 Claims, 2 Drawing Sheets

REVERSE PRESSURE TOLERANT SEAL MEANS

TECHNICAL FIELD

This invention relates to a seal apparatus for the gearbox of a rotary machine. Although this invention was developed in the field of gas turbine engines, it is applicable to any machine having a pressurized compartment which may encounter a rapidly developing reverse pressure gradient across the seal.

BACKGROUND ART

A typical axial flow, gas turbine engine has a compression section, a combustion section, and a turbine section. An annular flowpath for working medium gases extends axially through the sections of the engine. As the working medium gases are flowed through the engine, the gases are compressed in the compression section, burned with fuel to add energy to the gases in the combustion section, and expanded through the turbine section to develop useful work and thrust for the aircraft engine.

Energy in the form of work is transmitted via the rotor shaft to the compression section and through intermediate shafts to other locations for other applications. One application is to drive a gear shaft. The gear shaft in turn drives a gear train to reduce the rotational speed and drive auxiliary components such as an auxiliary power unit or a hydraulic pump. The hydraulic pump, for example, is used to supply highly pressurized hydraulic fluid to hydraulic actuators.

The gear train is disposed in a gearbox housing. Components within the gearbox housing, such as the gear train, are lubricated with oil which is sprayed on the gears. A seal assembly is provided to prevent the oil and air mixture which forms in the gearbox housing from escaping to the region adjacent the gearbox housing. In one particular embodiment, the seal assembly includes a seal housing and a carbon seal ring disposed in the seal housing. The carbon seal ring is slidable on the housing and is urged against a surface on the rotating shaft. This forms a primary seal for the interior of the gearbox housing, preventing leakage of the oil-air mixture from this first region of the engine (the interior of the gearbox) to the second region or exterior of the gearbox. A secondary seal is disposed between the housing and the slidable seal ring to provide sealing between these nonrotating components of the seal assembly. In one embodiment, the seal is an O-ring. The frictional force between the O-ring and the carbon seal ring is small to enable relatively free axial movement of the seal ring into engagement with the rotating shaft.

During abnormal operation of the engine, the hydraulic pump seal may fail, causing highly-pressurized hydraulic fluid to flood into the second region of the engine. The hydraulic fluid flows to the gearbox housing and into contact with the O-ring seal. The O-ring material may be degraded by contact with the hydraulic fluid. In addition, the O-ring may be moved by the pressure of the hydraulic fluid which may be (fifty) 50 times the pressure gradient across the O-ring seal under normal operative conditions and in the opposite direction. As a result, hydraulic fluid may enter the gearbox housing, mixing with oil to form sludge which in turn plugs up oil filters and small ducts for oil, resulting in an in-flight shutdown of the engine.

Accordingly, scientists and engineers working under the direction of Applicants' assignee have sought to develop a seal assembly for the gearbox housing which can tolerate severe reverse pressure gradients.

DISCLOSURE OF INVENTION

This invention is in part predicated on recognizing that a seal having sidewalls to block leakage in a first direction may use the reverse pressure gradient created by a fluid leaking in the opposite direction across the seal to block the leakage of that fluid across the seal. And, in one embodiment, the pressure may be used to increase the sealing force at both a secondary seal and against a seal ring to increase the sealing force exerted at the primary seal location, but not to an extent which would cause such premature wear of the primary seal that an in-flight shutdown would occur.

According to the present invention, a seal assembly between two regions which may suffer an abnormally large reverse pressure gradient has a seal having a closed front facing the normally high pressure region and a pair of sidewalls extending rearwardly toward the other region, the sidewalls being urged apart to engage sealing surfaces with a first force under normal operative conditions; and, to leave an opening therebetween that faces the other region so that any reverse pressure augments the normal sealing force to block leakage from the opposite direction.

In accordance with one embodiment of the present invention, the seal is disposed in a plenum which is bounded by a seal ring, the seal ring being slidable against a rotating shaft, having a sealing surface parallel to the direction of movement and having a second surface facing the plenum and facing away from the engagement of the seal ring with the rotating shaft such that the reverse pressure gradient urges the seal ring against the rotating shaft to increase the effectiveness of the primary seal and at the same time augments the normal sealing force of the secondary seal.

In accordance with one detailed embodiment of the present invention, a backing plate engages the front of the seal to axially position the seal within the seal plenum.

A primary feature of the present invention is a seal which extends between two sealing surfaces. In one embodiment, the seal is disposed in a plenum. The plenum is at the boundary of two adjacent regions. The seal extends between two sealing surfaces to provide a seal between the two adjacent regions. The seal has a front which bounds one end of the plenum and which faces the normally high-pressure region. The seal has two rearwardly extending sidewalls which engage the sealing surfaces. In one embodiment, the sidewalls are forced apart by spring means to exert a sealing force on the sealing surfaces. The spaced apart walls leave an opening in the seal. The opening faces the normally low pressure region. Another feature is the normally low pressure region, which may have an abnormally high pressure. In one detailed embodiment, this seal extends circumferentially about an axis of rotation of a rotor shaft. Another feature is a carbon seal ring which is urged axially against a sealing surface on the rotor shaft. The seal engages an axial sealing surface on the carbon seal ring and bounds one end of the plenum. At the other end of the plenum, the seal ring has a radial surface facing the opening of the seal. The radial surface is adjacent to and bounds a portion of the second region. Accordingly, pressure forces in the plenum are exerted on the interior of the seal through the opening and on the radial surface of the carbon seal ring.

A primary advantage of the present invention is a seal between two sealing surfaces which provides sealing against a pressure gradient in one direction under normal operative conditions and sealing against a sudden or steady-state reversal and increase in pressure gradient (in the other direction) by using sidewalls that are urged apart into engagement with the sealing surfaces by mechanical means and by the reverse pressure gradient. Another advantage is the axial stability of the seal when subjected to the reverse-pressure gradient which is provided by an axially-extending seal plate which engages an axially-rigid structure to axially position the seal. Another advantage, in one particular embodiment having an axially slidable seal ring which engages a rotating shaft, is the effectiveness of the primary seal which results from using the reverse-pressure gradient to force the seal ring against the rotating surface. Another advantage is the height of the plenum in which the seal is disposed which enables a seal of reasonable cross-sectional size and results from balancing axial pressure forces on the seal ring during abnormal operative conditions.

The foregoing features and advantages of the present invention will become more apparent in light of the following detailed description of the BEST MODE FOR CARRYING OUT THE INVENTION and in the accompanying drawings.

BEST MODE FOR CARRYING OUT THE INVENTION

Figures 1, 3:
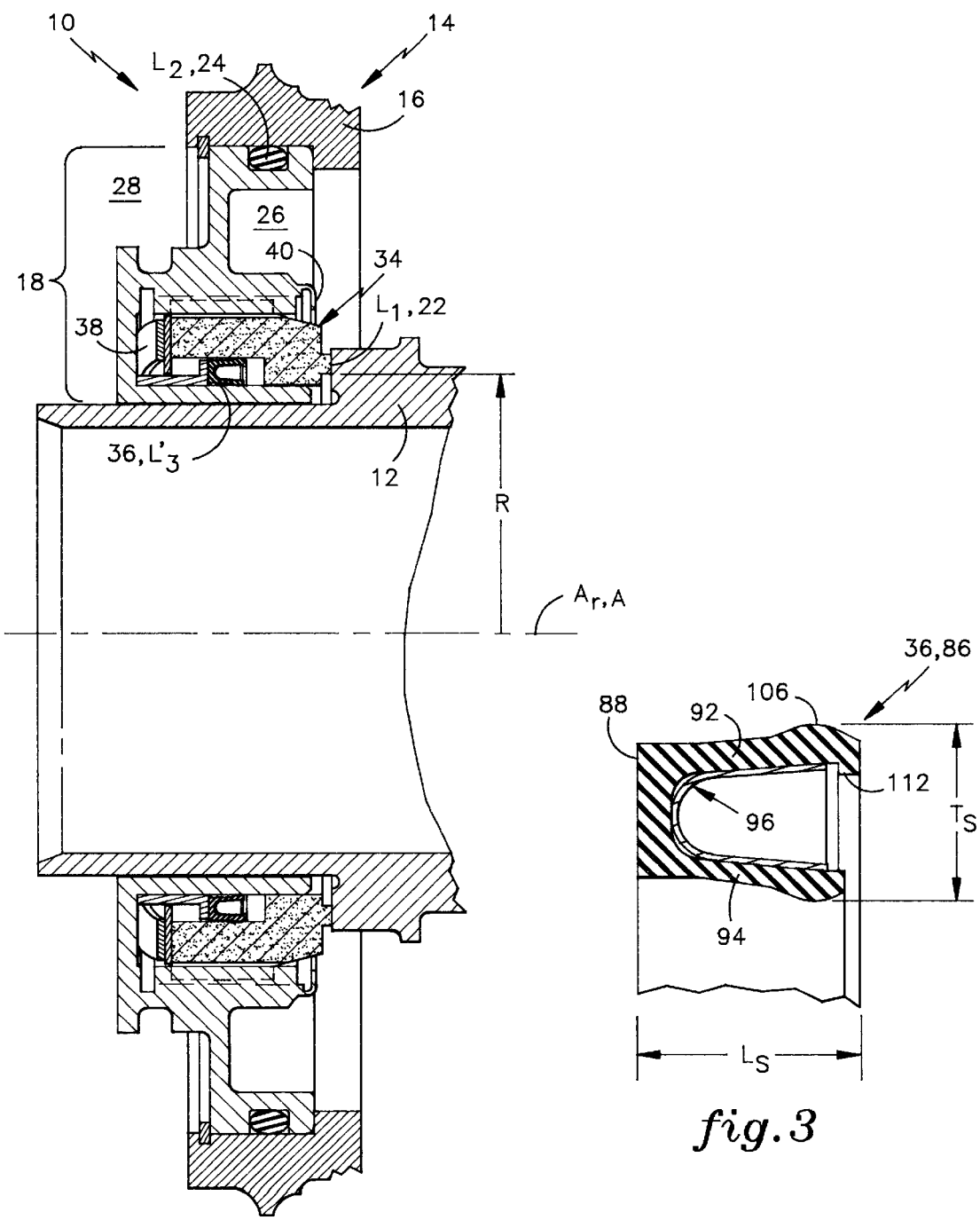
FIG. 1 is a side elevation view of a rotary machine, such as a gas turbine engine, with portions of the engine broken away to show a gear shaft, a gearbox housing into which the gear shaft extends and a seal assembly which extends between the gearbox housing and the gear shaft.
FIG. 3 is a side elevation view of a portion of the seal assembly of FIG. 1 showing an enlarged cross-sectional view of the seal from the seal assembly.

FIG. 1 is a side elevation view of a portion of a rotary machine 10 having a gear shaft 12. The gear shaft extends circumferentially about an axis of rotation $A_r$ and has a radius R. A gearbox 14 having a gearbox housing 16 extends circumferentially about the gear shaft and has a plurality of gears (not shown) which are driven by the gear shaft.

A seal assembly 18 extends circumferentially about the gear shaft 12. The seal assembly has an axis of symmetry A which coincides with the axis $A_r$. The seal assembly slidably engages the gear shaft at a first location $L_1$ to provide a primary seal 22 between the seal assembly and the shaft and engages the gearbox housing at a second location $L_2$ to provide a seal 24 between the gearbox housing and the seal assembly.

The gearbox 14 has an interior which is a first region 26 of the machine. This region on the interior of the gearbox housing 16 extends to and is bounded in part by the seal assembly 18. The first region of the machine contains sprayed oil and an oil and air mixture which are used to lubricate the gears in the gearbox housing. A second region 28 of the machine extends about the exterior of the seal assembly and gearbox housing. A hydraulic pump (not shown) is disposed in the second region of the engine.

Figure 2:
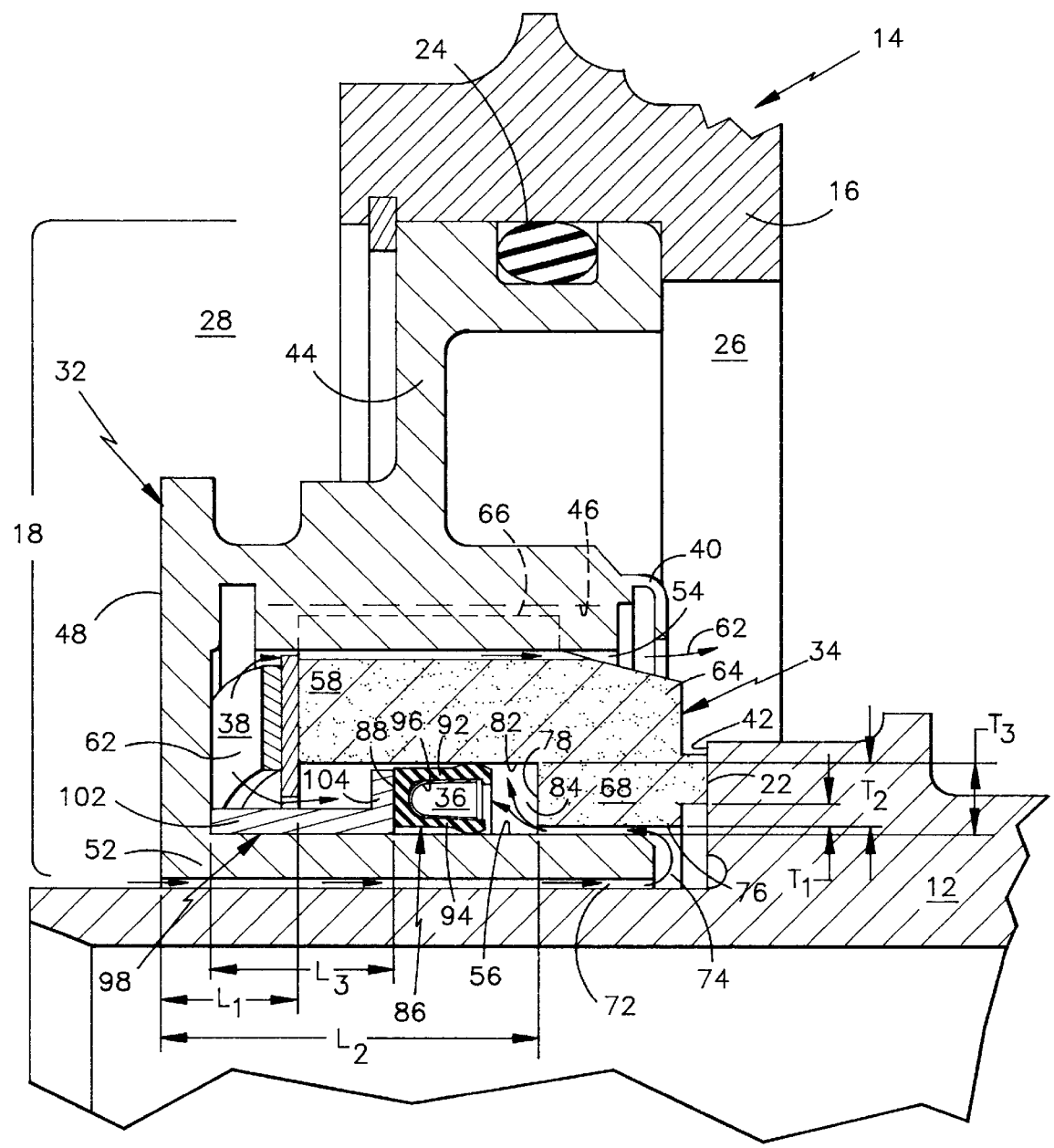
FIG. 2 is a side elevation view of a portion of the seal assembly of FIG. 1 showing an enlarged cross-sectional view of the seal assembly.

FIG. 2 is an enlarged view of the rotary machine shown in FIG. 1. As shown in FIG. 2, the seal assembly 18 includes a seal housing 32 and a carbon seal ring 34. The seal housing and carbon seal ring each extend circumferentially about the axis A. The seal assembly has a seal 36, commonly referred to as the secondary seal, which is disposed at location $L'_3$ between the seal ring and the housing. Means 38 for urging the seal ring axially against the rotating shaft 12 extends between the seal ring and the housing. A lip 40 extends circumferentially about the seal housing to trap the carbon seal ring in the seal assembly in the non-installed condition. The rotating shaft has a seal face 42 which adapts the shaft to engage the carbon seal ring.

The seal housing 32 has a first support 44 which extends axially and which extends circumferentially about the axis A. The support has a plurality of grooves 46 which extend axially and which extend radially in the support. A wall 48 extends radially inwardly from the first support. The wall extends circumferentially about the axis A and is spaced axially from the rotating seal face 42.

A second support 52 is spaced radially outwardly from the rotating shaft 12 and extends axially from the wall into close proximity with the rotating seal face 42. The second support is spaced radially inwardly from the first support leaving a cavity 54 therebetween. The cavity 54 is bounded by the wall, the second support and by an outwardly facing sealing surface 56 on the second support.

The carbon seal ring 34 is disposed in the cavity 54. The carbon seal ring extends circumferentially about the axis A. The seal ring has a first end 58 which is spaced axially from the wall by an axial length $L_1$. A first passage 62 extends between the first end and the wall. The seal ring has a second end 64 which engages the rotating seal face.

The carbon seal ring 34 has a plurality of axially extending splines 66. Each spline slidably engages in the axial direction a corresponding groove 46 in the first support 44 to radially position the seal ring about the first support. The spline connection permits axial movement of the seal ring with respect to the support and prevents circumferential movement.

The carbon seal ring 34 has a projection 68 at the second end 64. The projection extends circumferentially about the seal ring. The projection extends radially inwardly into the second region 28 and into close proximity with the second support 52. The projection is spaced radially from the second support leaving an opening 72 therebetween. A second passage 74 extends through the opening. The projection has a first radial surface 76 which extends for a radial height $T_1$. The first radial surface faces the rotating seal face 42 and bounds a portion of the second region 28. The projection has a second radial surface 78 which bounds a portion of the second region 28. The second radial surface faces the wall and is spaced from the wall by an axial length $L_2$. The second radial surface has a height $T_2$ which is greater than the radial height $T_1$.

The carbon seal ring 34 has an inner sealing surface 82 which faces inwardly. The inner sealing surface 82 is spaced radially from the sealing surface 56 on the second support, leaving a sealing plenum 84 therebetween. Accordingly, the first region 26 extends from the interior of the gearbox 14 via the first passage 62 to the sealing plenum. The second region 28 on the exterior of the gearbox extends past the seal ring via the second passage 74 to and into the sealing plenum.

The seal assembly includes the means 38 for urging the seal ring axially against the seal face. The means extends between the first end and the wall of the housing. In the embodiment shown, the means is represented by an axial spring which extends circumferentially. The axial spring is a wave thrust washer having a plate.

The seal 36 bounds the sealing plenum 84 and provides the boundary between the first region 26 and the second region 28. The seal includes three seal elements. The first seal element 86 extends circumferentially about the axis A and has a C-shaped cross section. The seal element has a front 88 which is closed and which faces toward and bounds the first region 26 and faces away from and bounds the second region 28. A first sidewall 92 extends rearwardly from the front to the first sealing surface 82 on the seal ring. A second sidewall 94 extends rearwardly from the front to the sealing surface 56 on the second support 52 of this seal housing.

A second seal element 96 is disposed on the interior of the first seal element(that is, inwardly of the exterior) and provides means for urging the sidewalls apart and into engagement with the sealing surfaces. In the embodiment shown, the second seal element is a mechanical device such as spring means, as represented by the C-shaped spring. The spring urges the first sidewall outwardly to exert a first sealing force against the first sealing surface 82. The spring exerts a force against the second sidewall such that the second sidewall exerts a second sealing force against the second sealing surface 56.

A third seal element 98 extends circumferentially about the axis A. The third seal element is L-shaped having a first leg 102 extending axially between the wall and the first seal element. A second leg 104 extends radially from the first leg to engage the first seal element in the axial direction. The third seal element has an axial length $L_3$ which is greater than or equal to the axially length $L_1$ from the wall to the first end of the carbon seal ring 34. The axial length $L_3$ is smaller than the axial length $L_2$, from the wall to the second radial surface on the seal ring by a distance $L_p$ which is greater than or equal to the length of $L_s$ of the first seal element. This distance $L_p$ is the length of the sealing plenum 84 under operative conditions.

FIG. 3 is an enlarged cross-sectional view of a portion of the seal 36 in the non-installed condition. The seal has a radial height $T_s$ which is greater than the installed radial height $T_3$. As shown, the first sidewall 92 has a curved contour 106 which matches the contour at the intersection between the first sealing surface 82 and the second radial surface 78 on the seal ring. This avoids line-to-line contact between the seal ring and the first seal element should axial contact occur under operative conditions or during installation.

As shown in FIG. 3, the first seal element 86 has a circumferentially extending lip 112 which aids in trapping the spring on the interior of the first seal element. In other embodiments the spring means might be disposed in the sidewalls of the seal element to protect the spring means against contact with a corrosive fluids. The first seal element is made of a resilient or rubber like material. As one example, such as in the embodiment shown, the first seal element is made entirely of Teflon® polytetrafluoreothylene material available from the Furon Company, Mechanical Seal Division, 4412 Corporate Center Drive, Los Alamitos, Calif.

During operation of the rotary machine shown in FIG. 3, oil is flowed to the first region 26 of the engine to lubricate gears driven by the gear shaft 12. The pressure on the interior of the compartment is approximately fifteen to seventeen (15 to 17) pounds per square inch (PSIA) under normal operative conditions of the engine. The pressure in the second region 28 on the exterior of the gearbox is ambient pressure which decreases with altitude. The pressure differential is in the range of one to two PSI.

Sealing against leakage from the pressurized interior 26 is provided by the primary seal 22 and the secondary seal 36. At the secondary seal, the sidewalls 92, 94 of the first seal element are urged radially outwardly by the spring 96 to force the arms against the first sealing surface 82 on the carbon seal ring 34 and the second sealing surface 56 on the second support 52 of the seal housing 32. This force is great enough to overcome the force acting on the arms which is generated by the difference in pressure between the greater pressure on the interior of the housing and the lesser pressure on the exterior of the housing.

At the primary seal, and as the shaft 12 rotates, the axial spring 38 urges the seal ring rearwardly such that the carbon seal ring engages the rotating seal face 42 on the rotor shaft. This prevents leakage of the pressurized oil and air at that location.

As the engine heats up during normal operation, differences in thermal growth in the axial and radial direction take place between the gearbox housing 16 and the rotating gear shaft 12. The seal ring 34 through its spline-type connection 44, 66 is positioned radially with respect to the rotor shaft and easily accommodates differences in radial growth between the rotating seal surface and the gearbox. The spline and groove engagement at the spline-type connection between the carbon seal ring and the seal housing enable the carbon seal ring to move axially in response to thermal growth between these two structures. The Teflon® material of the seal 36 allows the carbon seal ring to slide with respect to the first seal element. Should the difference in pressure grow between the interior and the exterior of the engine, the first seal element in some applications might be urged by the higher internal pressure in the axial direction until the seal element engages the second radial surface 78 on the carbon seal ring. The contour on the second radial surface matches the contour 106 on the first side wall 92 of the first seal element. This match of contours enables the two structures to bump together without doing damage to the seal element. This also avoids damage at assembly.

Under an abnormal operative condition, such as might occur if there is a rupture of a seal in the accessory hydraulic pump, hydraulic fluid rushes into the second region of the engine at a pressure which can approach three-hundred (300) pounds per square inch. As the hydraulic fluid surges through the second passage and then into the seal plenum 84, the hydraulic fluid exerts significant forces on the first seal element driving the first seal element 86 toward the wall 48 of the seal housing 32. The third seal element, backing plate 98, stops the axial movement of this first seal element and supports the first seal element against further axial movement toward the wall.

At the same time, the hydraulic fluid in the second region 28 exerts a first force on the carbon seal ring 34 at the second radial surface 78 forcing the seal ring tightly against the rotating seal face 42. The hydraulic fluid also exerts a second force on the carbon seal ring at the first radial surface 76. This second force balances to a predetermined extent the first force acting on the second radial surface, decreasing the normal (perpendicular) force and thus the frictional force between the carbon seal ring and the rotating seal face. Balancing the forces exerted by the hydraulic fluid avoids undue wear of the carbon seal ring. This additional pressure force augments the sealing force against the carbon seal ring and blocks leakage of the very high pressure hydraulic fluid through the primary seal. Thus, although increased force exerted by the pressurized fluid is used to block the leakage of hydraulic fluid, the force is not so great as to cause undue wear of the carbon seal ring. Accordingly, good sealing is provided during abnormal operative conditions by using pressurization of the seal plenum with hydraulic fluid to augment the sealing force at the primary seal and to augment the sealing force at the secondary seal.

The spline connection 44, 66 resists the circumferential forces exerted on the seal ring. Because the sealing plenum 84 extends circumferentially about the carbon seal ring, the radial forces of the hydraulic fluid tend to cancel out.

A particular advantage of the present invention is the durability of the first seal element 86 which is made of pure Teflon® material. The pure Teflon® material is impervious to hydraulic fluid, to fuel, and to synthetic turbine oil. Each of these fluids often attack materials which are compatible with the other materials. Another advantage is the level of friction between the first seal element and the seal ring, enabling the seal ring to position itself axially which results from the material characteristics of the Teflon® material.

Finally, another advantage of using the first and second surfaces for pressure balancing is the radial height of the sealing plenum 84. This enables installation of a C-shaped seal of reasonable height. Without the first radial surface, the force exerted on the second radial surface would be relatively high and would result in faster wear of the carbon seal on the rotating seal surface by reason of the increased normal force. The other alternative would be to make the height of the plenum smaller. This may cause fabrication difficulties. For example, in one embodiment the diameter of the shaft is approximately two inches and the height of the plenum is approximately one-tenth of an inch.

Although the invention has been shown and described with respect to detailed embodiments thereof, it should be understood by those skilled in the art that various changes in form and detail thereof may be made without departing from the spirit and scope of the claimed invention.

We claim:

1. A seal having an axis A which bounds a sealing plenum between a first region and a second region, the seal including a first sealing surface and a second sealing surface which extend circumferentially about the axis A and which are spaced radially to form the plenum, which comprises:

a first seal element which bounds a portion of the plenum, which extends circumferentially about the axis A and which has a C-shaped cross section, the seal element having a front which is closed and which faces the first region, a first sidewall extending from the front to the first sealing surface and a second sidewall extending from the front to the second sealing surface, second seal element means disposed on the interior of the first seal element for urging the sidewalls apart leaving an opening therebetween and for urging the sidewalls apart into engagement with the sealing surfaces such that the first wall exerts a first sealing force against the first sealing surface and the second wall exerts a second sealing force against the second sealing surface, and a third seal element extending circumferentially about the axis A and having a surface extending radially to engage the front of the first seal element, wherein the seal is adapted by the second seal element means to block the leakage of fluid from the first region by urging the sidewalls against the sealing surfaces and wherein the seal is adapted by the opening to allow pressurized fluid from the second region to exert a sealing force against the sidewalls to augment the sealing force from the second seal element means under operative conditions at which the pressure of the second region substantially exceeds the pressure of the first region, and wherein the third seal element positions the first seal element in the axial direction to resist the pressure force from the second region.

2. The seal of claim 1 wherein the third seal element has a first leg extending axially which engages the second sealing surface and a second leg extending radially which engages the front of the first sealing element.

3. The seal of claim 2 wherein the second sealing surface has a wall which extends radially from the first sealing surface, the wall being spaced axially from the first seal element by a length $L_3$ and wherein the length of the third seal element is the length $L_3$ such that the wall resists movement of the seal caused by a pressure in the second region which is larger than the pressure in the first region.

4. The seal of claim 1 wherein the seal further includes a carbon seal ring having a first end adjacent the first region and a second end adjacent the second region, the first sealing surface extending between the ends and the front of the seal facing the first end and wherein the carbon seal ring has a projection at the second end which extends circumferentially and radially inwardly into close proximity with the second sealing surface and is spaced radially therefrom leaving a second passage therebetween, the projection having a first radial surface which extends for a radial height $T_1$ and which faces away from the front of the seal, the projection having a second radial surface which has a height $T_2$ which is greater than the radial height $T_1$, the second radial surface facing the seal, and wherein the surface facing the two radial surfaces bound in part the second region such that a pressure in the second region which is higher than a pressure in the first region urges the seal in a first axial direction and the carbon seal ring in the opposite axial direction and wherein the pressure force on the first radial surface opposes the pressure force on the second radial surface to balance forces on the carbon seal ring under operative conditions.

5. The seal of claim 4 wherein the first seal element is polytetrafluoroethylene material.

6. A seal assembly for a rotary machine, the seal assembly extending circumferentially about an axis of rotation A and being adapted to be disposed between a machine housing and a rotating seal face, which comprises:

a seal housing extending circumferentially about an axis A, the seal housing having a first support which extends axially and circumferentially about the axis A, the support having a plurality of axially oriented grooves which face radially inwardly, a wall which extends radially inwardly from the first support, and which extends circumferentially about the axis A, a second support which extends axially from the wall and which is spaced radially inwardly from the first support leaving a cavity therebetween which is bounded by the wall and an outwardly facing sealing surface on the second support;

a carbon seal ring which is disposed in the cavity and which extends circumferentially about the axis A, the seal ring having a plurality of axially extending splines each of which slidably engages in the axial direction a corresponding groove in the first support to radially position the seal ring about the second support and to permit axial movement of the seal ring, the seal ring having a first end which is spaced axially from the wall by an axial length $L_1$ leaving a first passage therebetween and a second end which is adapted to engage the rotating seal face, the seal ring having a projection at the second end which extends circumferentially and radially inwardly into close proximity with the second support and is spaced radially therefrom leaving a second passage therebetween, the projection having a first radial surface which extends for a radial height $T_1$ and which faces away from the wall, the projection having a second radial surface which has a height $T_2$ which is greater than the radial height $T_1$, the second radial surface facing the wall and being spaced from the wall by an axial length $L_2$, the seal ring having a sealing surface which faces inwardly, which extends from the second radial surface, and which is spaced radially from the sealing surface on the second support leaving a sealing plenum therebetween such that a first region extends from the interior of the seal assembly via the first passage to the plenum and a second region extends from the exterior via the second passage to the plenum, the second region being bounded in part by the first radial surface and the second radial surface of the projection;

means for urging the seal ring axially away from the wall, the means extending between the second end and the wall of the seal housing;

a seal which is disposed in the sealing plenum between the first region and the second region and which includes a first seal element which extends circumferentially about the axis A and which has a C-shaped cross section, the seal element having a front which is closed and which faces the first region, a first sidewall extending from the front to the first sealing surface and a second sidewall extending from the front to the second sealing surface, a second seal element spring means disposed on the interior of the first seal element for urging the sidewalls apart and into engagement with the sealing surfaces such that the first wall exerts a first sealing force against the first sealing surface and the second wall exerts a second sealing force against the second sealing surface, a third seal element extending circumferentially about the axis A having a first leg extending axially from the wall to the first seal element and a second leg extending radially to engage the first seal element, the third seal element having an axial length $L_3$ which is greater than or equal to the axial length $L_1$ from the wall to the first end of the seal ring, and wherein the axial length $L_3$ is smaller than the axial length $L_2$ from the wall to the second radial surface on the seal ring by a distance $L_p$ which is greater than or equal to the length $L_s$ of the first seal element;

wherein the sidewalls of the seal are urged by the spring means against the sealing surfaces of the seal ring and the support to block the leakage of fluid outwardly at that secondary location; and wherein under operative conditions at which the second region is at a much higher pressure from the presence of pressurized fluid than the first region, and the pressurized hydraulic fluid adds its force to the force of the spring means to block the leakage of hydraulic fluid into the first region at the secondary location and adds its force to the forces acting on the seal ring in the axial direction, the high pressure of the fluid acting on the second radial surface of the seal ring being partially balanced by the high pressure of the fluid acting on the first radial surface.

7. A seal assembly for rotary machine, the seal assembly extending circumferentially about an axis of rotation Ar and being disposed between a gearbox housing and a rotating seal face, which comprises:

a seal housing extending circumferentially about an axis A which is coincident with the axis Ar, the seal housing having a first support which extends axially and circumferentially about the axis of rotation, the support having a plurality of axially oriented grooves which face radially inwardly, wall which extends radially inwardly from the first support, which extends circumferentially about the axis of rotation, and which is spaced axially from the rotating seal face, a second support which is spaced radially outwardly from the rotating shaft, which extends axially from the wall into close proximity with the rotating seal face, and which is spaced radially inwardly from the first support leaving a cavity therebetween which is bounded by the wall and an outwardly facing sealing surface on the second support;

a carbon seal ring which is disposed in the cavity and which extends circumferentially about the axis of rotation, the seal ring having a plurality of axially extending splines each of which slidably engages in the axial direction a corresponding groove in the first support to radially position the seal ring about the second support and to permit axial movement of the seal ring, the seal ring having a first end which is spaced axially from the wall by an axial length $L_1$ leaving a first passage therebetween and a second end which engages the rotating seal face, the seal ring having a projection at the second end which extends circumferentially and radially inwardly into close proximity with the second support and is spaced radially therefrom leaving a second passage therebetween, the projection having a first radial surface which extends for a radial height $T_1$ and which faces the rotating seal face, the projection having a second radial surface which has a height $T_2$ which is greater than the radial height $T_1$, the second radial surface facing the wall and being spaced from the wall by an axial length $L_2$, the seal ring having a sealing surface which faces inwardly, which extends from the second radial surface, and which is spaced radially from the sealing surface on the second support leaving a sealing plenum therebetween such that a first region extends from the interior of the gearbox via the first passage to the plenum and a second region extends from the exterior of the gearbox via the second passage to the plenum, the second region being bounded in part by the first radial surface and the second radial surface of the projection;

means for urging the seal ring axially away from the wall and against the rotating seal face, the means extending between the second end and the wall of the seal housing;

a seal which is disposed in the seal plenum between the first region and the second region and which includes a first seal element which extends circumferentially about the axis A and which has a C-shaped cross section, the seal element having a front which is closed and which faces the first region, a first sidewall extending from the front to the first sealing surface and a second sidewall extending from the front to the second sealing surface, a second seal element spring means disposed on the interior of the first seal element for urging the sidewalls apart, leaving an opening therebetween which faces the second region and into engagement with the sealing surfaces such that the first wall exerts a first sealing force against the first sealing surface and the second wall exerts a second sealing force against the second sealing surface, a third seal element extending circumferentially about the axis A having a first leg extending axially from the wall to the first seal element and a second leg extending radially to engage the first seal element, the third seal element having an axial length $L_3$ which is greater than or equal to the axial length $L_1$ from the wall to the first end of the seal ring, and wherein the axial length $L_3$ is smaller than the axial length $L_2$ from the wall to the second radial surface on the seal ring by a distance $L_p$ which is greater than or equal to the length $L_s$ of the first seal element;

wherein under normal operative conditions the first region is at a higher pressure than the second region; wherein the seal ring is urged against the rotating seal surface at that primary location to block the leakage of oil from the gearbox and the sidewalls of the seal are urged by the spring means against the sealing surfaces of the seal ring and the support to block the leakage of oil from the gearbox at that secondary location; and wherein under abnormal operating conditions the second region is at a much higher pressure from the presence of pressurized hydraulic fluid than the first region, and the pressurized hydraulic fluid adds its force to the force of the spring means to block the leakage of hydraulic fluid into the gearbox at the secondary location and adds its force to the forces acting on the seal ring to urge the seal ring against the rotating seal surface, the high pressure of the hydraulic fluid acting on the second radial surface of the seal ring being balanced by the axial force acting on the first radial surface.

* * * * *